US005977993A

United States Patent [19]

Matsuda

[11] Patent Number: 5,977,993

[45] Date of Patent: Nov. 2, 1999

[54] DISPLAY CONTROL DEVICE FOR IMAGE PROCESSING APPARATUS

[75] Inventor: Hiroshi Matsuda, Yokohama, Japan

[73] Assignee: Canon Kabushiki Kaisha, Tokyo, Japan

[21] Appl. No.: 08/997,526

[22] Filed: Dec. 23, 1997

[30] Foreign Application Priority Data

Dec. 30, 1996 [JP] Japan .................................... 8-358401

[51] Int. Cl.[6] ...................................................... G06F 13/00

[52] U.S. Cl. .......................... 345/508; 345/202; 395/101; 395/114; 399/85

[58] Field of Search .................................... 345/501, 507, 345/508, 511, 202, 502, 514; 395/101, 114–116; 358/426, 427, 261.1–261.4, 443, 444, 448; 399/81, 85

[56] References Cited

U.S. PATENT DOCUMENTS

| | | | |
|---|---|---|---|
| 5,276,799 | 1/1994 | Rivshin | 345/502 |
| 5,619,649 | 4/1997 | Kounat et al. | 395/114 |
| 5,740,496 | 4/1998 | Kawabuchi et al. | 399/81 |

*Primary Examiner*—Kee M. Tung
*Attorney, Agent, or Firm*—Fitzpatrick, Cella, Harper & Scinto

[57] ABSTRACT

Screen data to be presented on the display section of an image processing apparatus is compressed and then stored in a memory. For presentation, the screen data to be presented is read, decompressed and stored in a VRAM. Screen data frequently used, such as the one for a standard screen, is stored in a cache area in a RAM after decompression, and such screen data is transferred from the cache to the VRAM.

18 Claims, 8 Drawing Sheets

DISPLAY CONTROL DEVICE FOR IMAGE PROCESSING APPARATUS

BACKGROUND OF THE INVENTION

1. Field of the Invention

The present invention relates to a display control device for an image processing apparatus.

2. Description of the Related Art

Image processing apparatuses today are provided with more and more functionality. Along with an increase in functionality, many of the image processing apparatuses employ an operation section comprising a combination of a touch panel and a large-scale liquid-crystal display. Since such an operation section of touch panel eliminates an inconvenient cross-checking step between a key board and an operation screen and bears extensively graphic indication thereon, the ease of use is greatly enhanced. Data presented on a liquid-crystal display panel is however increased accordingly. As means for resolving such a problem, image data is compressed and stored in memory means. The compressed image data is read in response to the operation of the operation section (touch panel), decompressed and then presented on screen.

When the compressed image data is read from the memory means and is decompressed each time the operation section is operated for image presentation, the entire image presentation process is slowed because each decompression process of image data takes some time. This consequently degrades the ease of use.

SUMMARY OF THE INVENTION

Accordingly, it is one object of the present invention to provide a display control device and a display control method free from the above problem.

It is yet another object of the present invention to provide a display control device and a display control method for compressing data for a setup screen in image processing mode to reduce the quantity of stored data and for presenting fast the setup screen.

It is a further object of the present invention to provide a display control device for presenting fast the setup screen by holding decompressed data for the standard setup screen that is presented at a higher frequency.

These and other objects of the present invention will become apparent from the following description of its embodiments in conjunction with the accompanying drawings.

DESCRIPTION OF THE PREFERRED EMBODIMENTS

Figure 1:
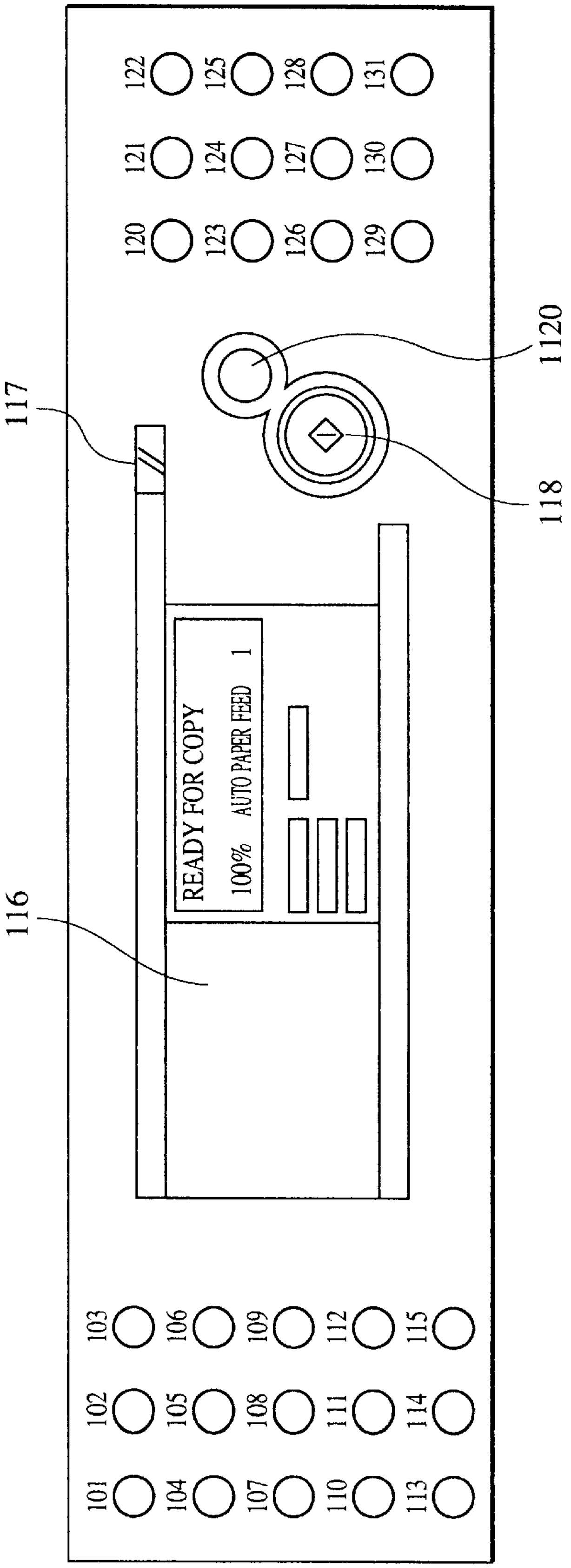
FIG. 1 shows an operation section of an image processing apparatus that implements the present invention.

Referring now to the drawings, the preferred embodiments of the present invention are discussed.

First Embodiment

FIG. 1 shows an operation section of an image processing apparatus that implements the present invention. Keys (hard keys) 101 through 115 are used to set a variety of image forming modes and each key contains its own LED which is lit when the key is operated to set the corresponding mode. A liquid-crystal display 116 having a touch panel on its surface is used to constitute a variety of soft keys.

Figure 2:
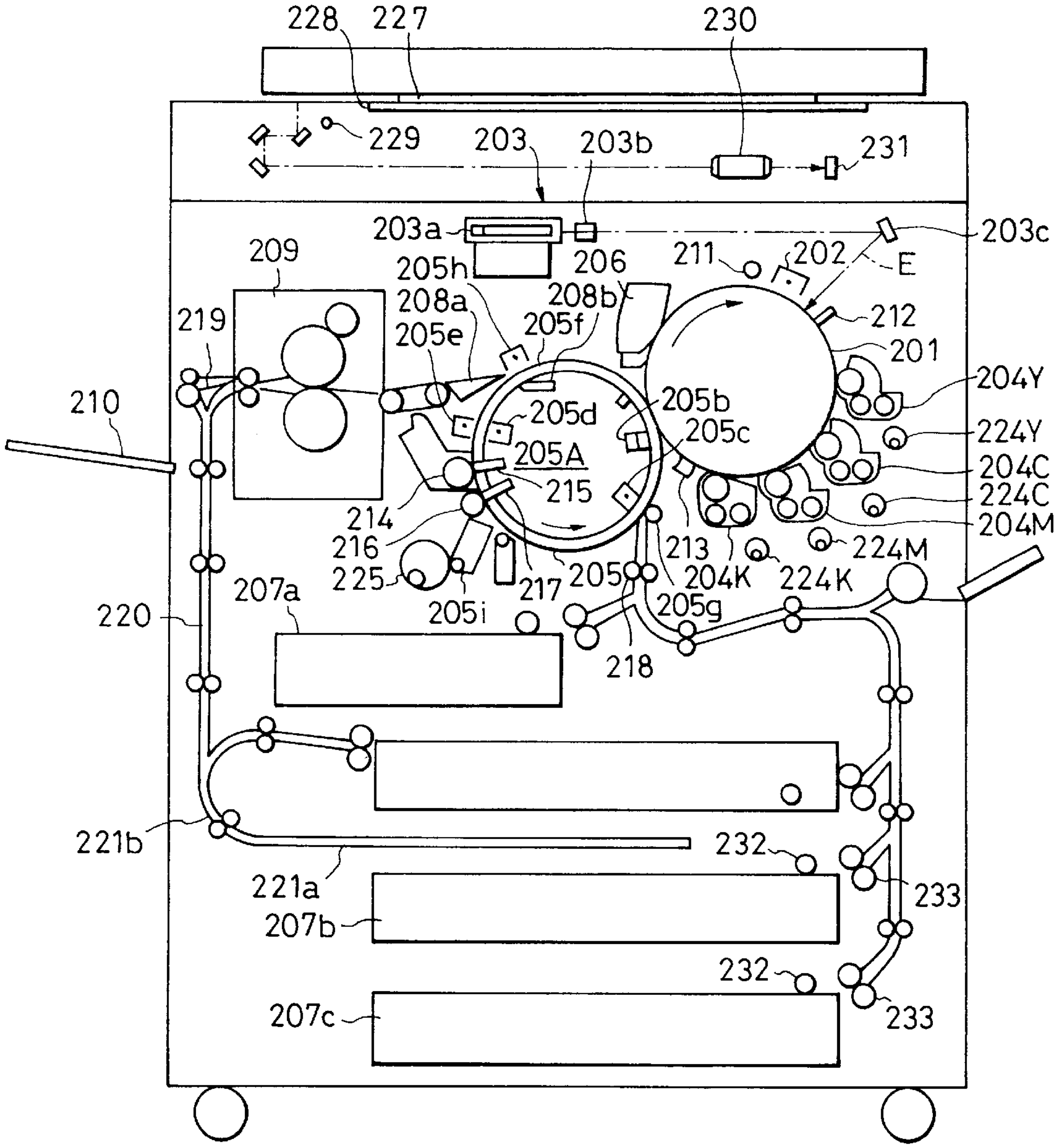
FIG. 2 is a cross-sectional view of the image processing apparatus.

FIG. 2 is a cross-sectional view of the image forming apparatus.

The image forming apparatus comprises a digital color image reader module in its upper portion and a digital color image printer module in its lower portion. In the reader module, an exposure lamp 229 lights and scans an original document 227 placed on a document carriage glass platen 228, and a full-color sensor 231 collects light reflected from the original document 227 through a lens 230 to obtain color separated image signals. The color separated image signals are amplified through amplifiers (not shown), and are processed through a video processing unit (not shown) to be sent to the printer module.

A photoconductive drum 201 as an image bearing body in the printer module is supported in such a manner that allows the drum 201 to rotate in the direction of the arrow. Arranged around the photoconductive drum 201 are a pre-exposure lamp 211, a corona charging unit 202, a laser exposure optical system 203, a potential sensor 212, four developing units 204Y, 204C, 204M, and 204Bk, density detector means 213, a transfer assembly 205, and a cleaning unit 206.

In the laser exposure optical system 203, the image signal from the reader module is converted into a laser light signal through a laser output unit (not shown), and the resulting laser light beam is reflected by a polygon mirror 203*a*, and is projected onto the photoconductive drum 201 through a lens mirror 203*b* and a mirror 203*c*. During the image forming in the printer module, the photoconductive drum 201 is rotated in the direction of the arrow. The photoconductive drum 201 is uniformly charged by the charging unit 202 after being discharged by the pre-exposure lamp 211. Light images E of respective colors are separately projected onto the photoconductive drum to form a latent image.

The development units are operated to develop the latent image into a toner image on the photoconductive drum 201. The development units are set to be selectively close one at a time to the photoconductive drum 201 by the operation of eccentricity cams 224Y, 224C, 224M and 224Bk.

A recording material to which an image is transferred is placed in a recording material cassette. The recording material is picked up by a pickup roller 232 and is then transported by feeder rollers 233 toward regist rollers 218. An unshown light transmission sensor is arranged immediately upstream of the regist rollers 218 so that the type of the recording material now being transported is determined by the time the recording material needs to pass the sensor by. The recording material now at the regist rollers 218 is transported by the regist rollers 218 to a transfer drum 205*a* at a timing at which the forward edge of the image on the photoconductive drum 201 and the forward edge of the recording material coincide. The recording material is charge-attracted to the transfer drum 205*a* by opposed attracting roller 205*g* and charging unit 205*c*. A charge transfer unit 205*b* transfers the toner image from the photoconductive drum 201 to the recording material.

The transfer assembly 205 in this embodiment comprises the transfer drum 205*a*, the charge transfer unit 205*b*, an inner charge unit 205*d*, and an outer charge unit 205*e*. The transfer drum 205*a* is rotatably supported. A recording material carriage sheet 205*f* of a dielectric extends over the transfer drum 205*a* to cover the open portion of the circumference of the transfer drum 205*a*. The recording material carriage sheet 205*f* is of a dielectric sheet, for example, of polycarbonate film.

As the drumlike transfer assembly, namely, the transfer drum 205*a*, is rotated, the charge transfer unit 205*b* transfers the toner image from the photoconductive drum 201 to the recording material carried by the recording material carriage sheet 205*f*.

A color image of the required number of colors is thus formed on the recording material attracted and carried by the recording material carriage sheet 205*f*. A full-color image is thus formed.

In the full-color image forming process, a four-color toner image is transferred to the recording material, a detaching claw 208*a*, assisted by a pushup roller 208*b* and a detaching charger 205*h*, detaches the recording material from the transfer drum 205*a*, and the toner image is then fixed to the recording material by thermal fusing rollers 209. The resulting recording material is then delivered into a tray 210.

The photoconductive drum 201 is cleaned by the cleaning unit 206 to remove toner residues therefrom, and then repeats another image forming cycle. Both-side image forming processing is performed as follows. When the recording material having an image on one side is output from the thermal fusing rollers 209, a transport path switch guide 219 is driven to allow the recording material to advance through a vertical transport path 220 to a turnaround path 221*a*. Rotating turnaround rollers 221*b* in a reverse direction causes the recording material to recede and to be placed into an intermediate tray. The other side of the recording material is then subjected to another image forming cycle.

In order to prevent toner powder from clinging to or dispersing onto the recording material carriage sheet 205*f* of the transfer drum 205*a* and in order to prevent oil sticking to the recording material, cleaning operations are performed by a fur brush 214 and a backup brush 215 facing the fur brush 214 with the recording material carriage sheet 205*f* interposed therebetween, and by an oil removing roller 216 and a backup brush 217 facing the oil removing roller 216 with the recording material carriage sheet 205*f* interposed therebetween. These cleaning operations may be carried out prior to or subsequent to image forming, and may be performed any time the apparatus is restarted after a paper jamming is detected and corrected.

In this embodiment, by driving an eccentricity cam 225 at a predetermined timing and by causing a cam follower 205*i* affixed to the transfer drum 205*a* to follow the cam 225, the gap between the recording material carriage sheet 205*f* and the photoconductive drum 201 is set to be as intended. For example, the transfer drum and the photoconductive drum are spaced apart from each other during standby or power off period.

Figure 3:
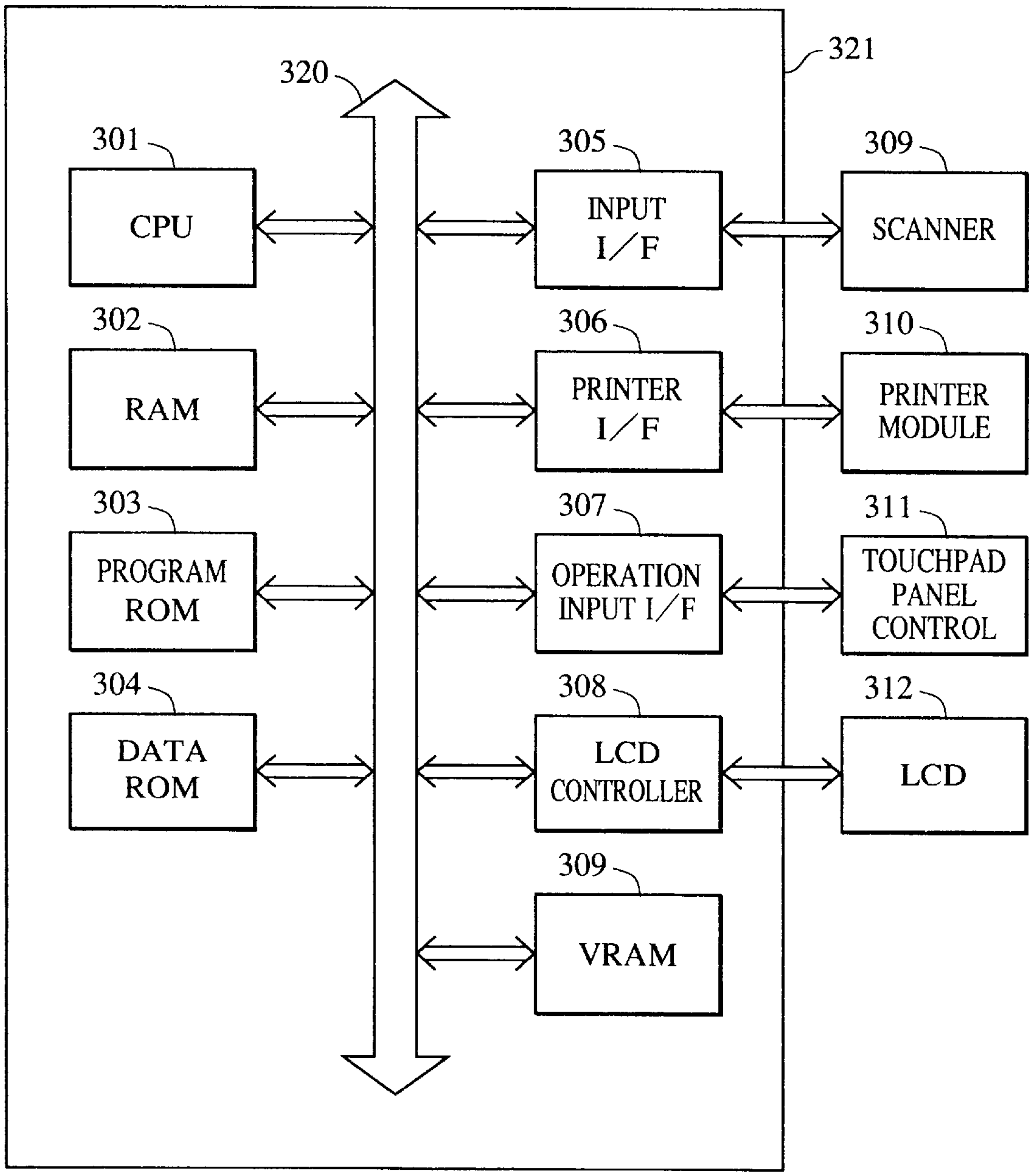
FIG. 3 is a block diagram showing the image processing apparatus.

FIG. 3 is a block diagram showing the construction of the system of the image processing apparatus.

In the image processing apparatus 321, control CPU 301 generally controls access to a variety of devices connected to a system bus 320 under a control program stored in program ROM 303, reads information input from a scanner 309 (in the reader module in FIG. 2) connected to the apparatus 321 via an input image interface (I/F) 305, and outputs an image signal to a printer 310 (the printer module in FIG. 2) connected to the apparatus 321 via a printer I/F 306. Data ROM 304 stores compressed data. Although the compressed data is decompressed by CPU 301, a decompression circuit may be separately arranged. Program ROM 303 stores the control program as shown in flow diagrams in FIGS. 6 through 8. A main memory 302 for CPU 301 is a RAM memory functioning as a working memory, and receives inputs from a touch panel 311 and hard key (the touch panel and hard key in FIG. 1) via an operation input I/F 307.

An LCD 312 (116 in FIG. 1) presents display information (screen information) that is retrieved from a video RAM (VRAM) 313 via an LDC controller 308.

Figure 4A:
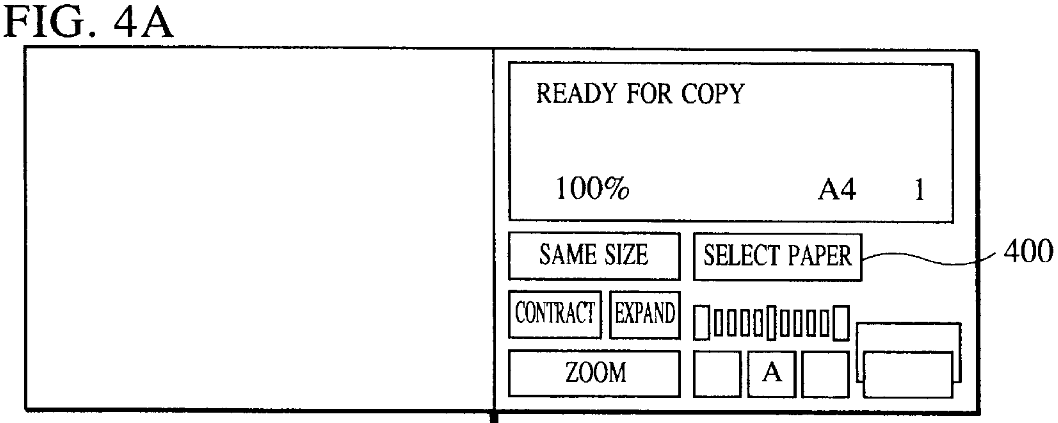
FIGS. 4A, 4B, 4C, and 4D show how the display of the apparatus is changed from one screen after another in a first embodiment of the present invention.
Figure 4B:
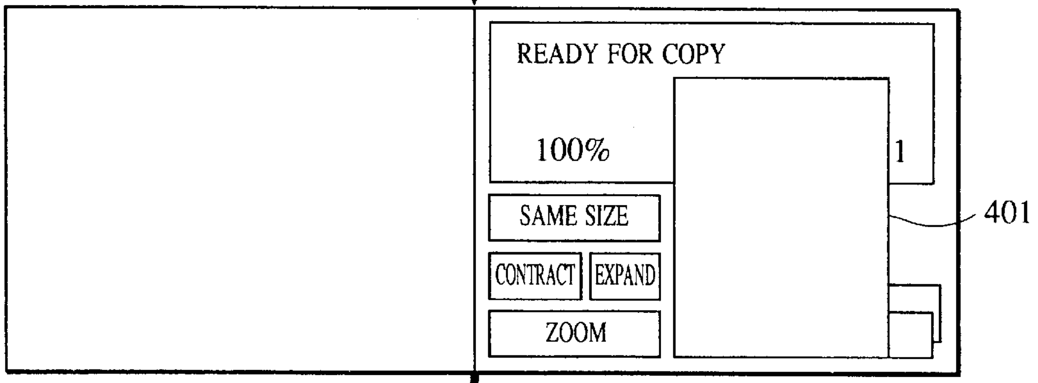
Figure 4C:
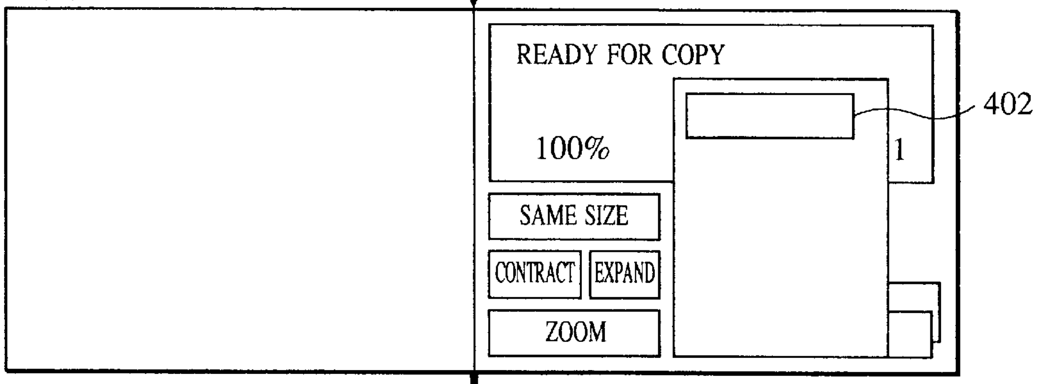
Figure 4D:
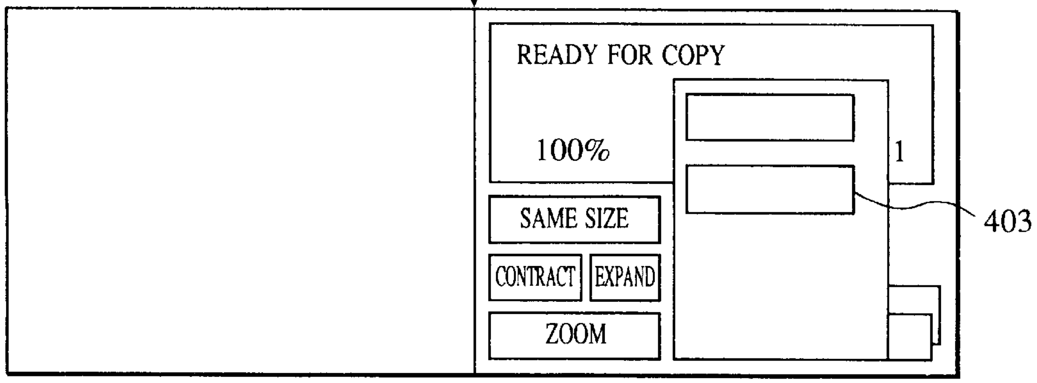
Figure 5E:
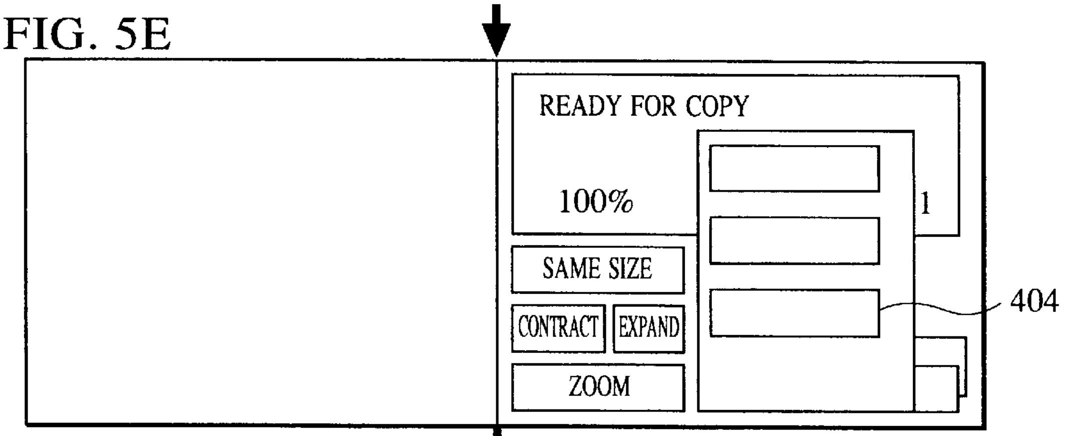
FIGS. 5E, 5F, 5G, and 5H show a continuation of the display change of FIGS. 4A–4D.
Figure 5F:
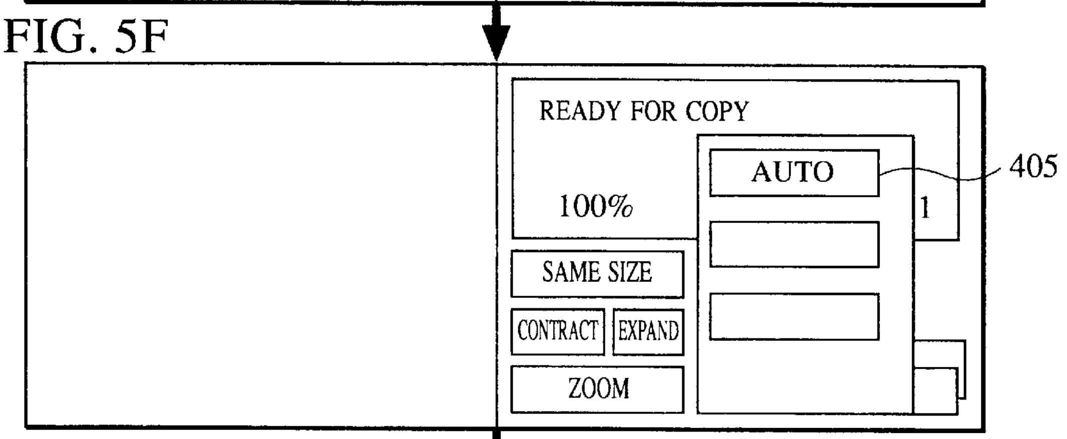
Figure 5G:
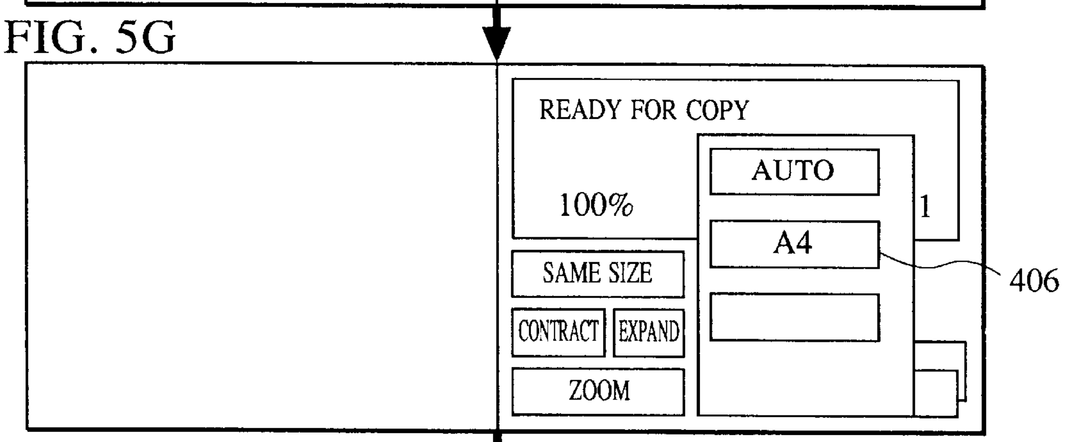
Figure 5H:
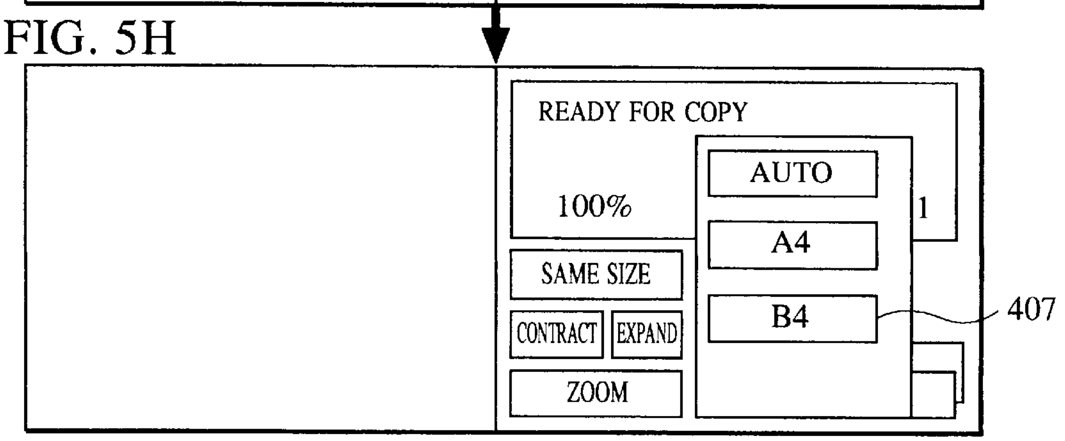

A screen presentation process in the operation section of the image forming apparatus is now discussed referring to a "select paper" screen. FIGS. 4A–4D and 5E–5H show a display of LCD 312 (116 in FIG. 1). When a "select paper" key on the touch panel is pressed, a small window 401 in FIG. 4B appears, changes and finally becomes a liquid-crystal display screen in FIG. 5H. This presentation process is divided into screens in FIG. 4A–4D and FIG. 5E–5H in terms of bitmap. A bitmap screen of the frame of the select paper window 401 shown in FIG. 4B is overlaid on the basic screen shown in FIG. 4A. Bitmap screens 402 in FIG. 4C, 403 in FIG. 4D, 404 in FIG. 5E representing selection buttons are sequentially presented. Furthermore, bitmap screens 405 in FIG. 5F, 406 in FIG. 5G, and 407 in FIG. 5H representing character strings on the buttons are sequentially presented. In the presentation process of the apparatus, a plurality of bitmap screens are sequentially presented to form a window.

Figure 6:
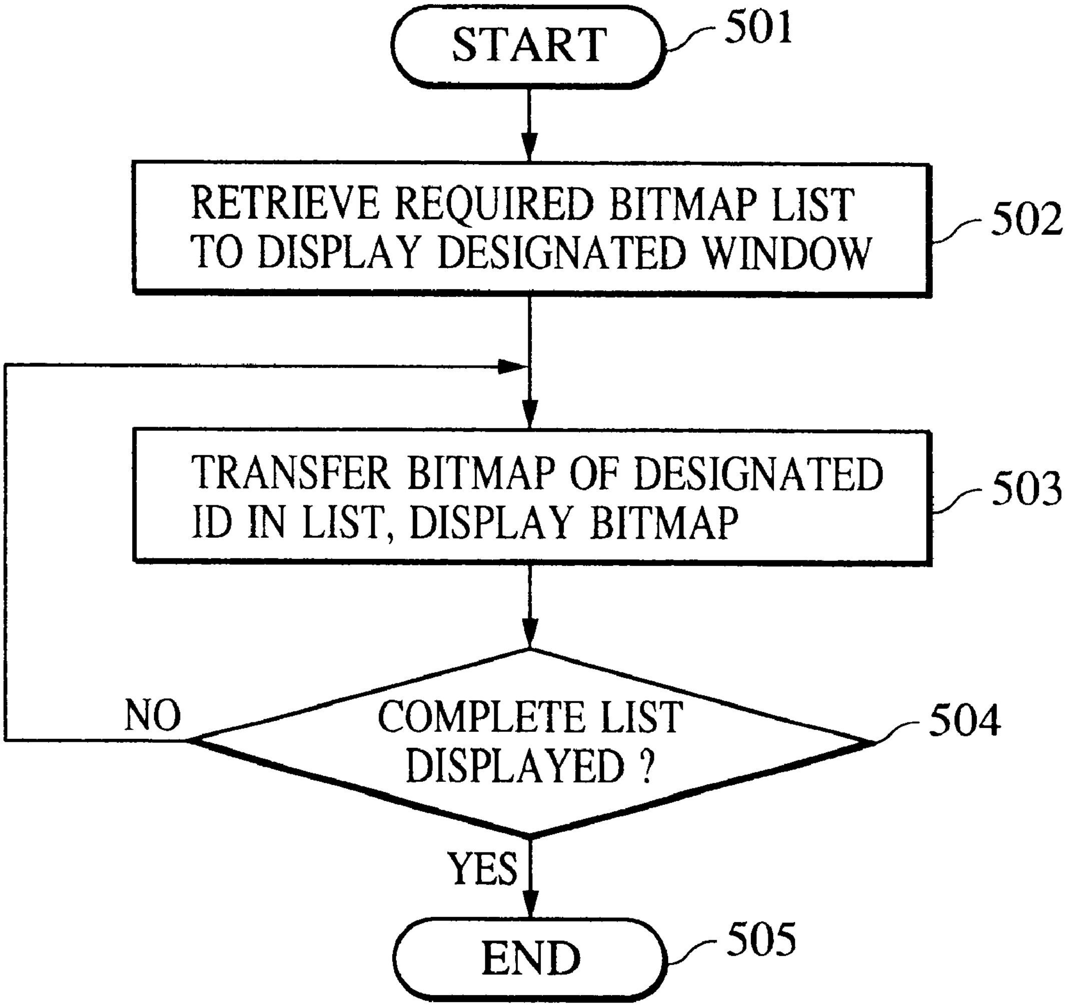
FIG. 6 is a flow diagram for screen presentation in the image processing apparatus.

The typical process steps of the screen presentation is now illustrated in a flow diagram in FIG. 6. In this flow diagram, a new window is presented. The process starts in step 501. In step 502, an ID list of bitmaps required to display a window designated by the touch panel and hard key 311 is retrieved from the data ROM 304, and is stored in RAM 302. In step 503, ID bitmap data designated by the list are transferred piece by piece from RAM 302 to VRAM 313 to display them on LCD 312 (as will be detailed later). In step 504, a determination is made of whether the processing of the list is completed to its end. When the list is completed, the process goes to step 505. When the list is not yet completed, the process returns to step 503.

Figure 7:
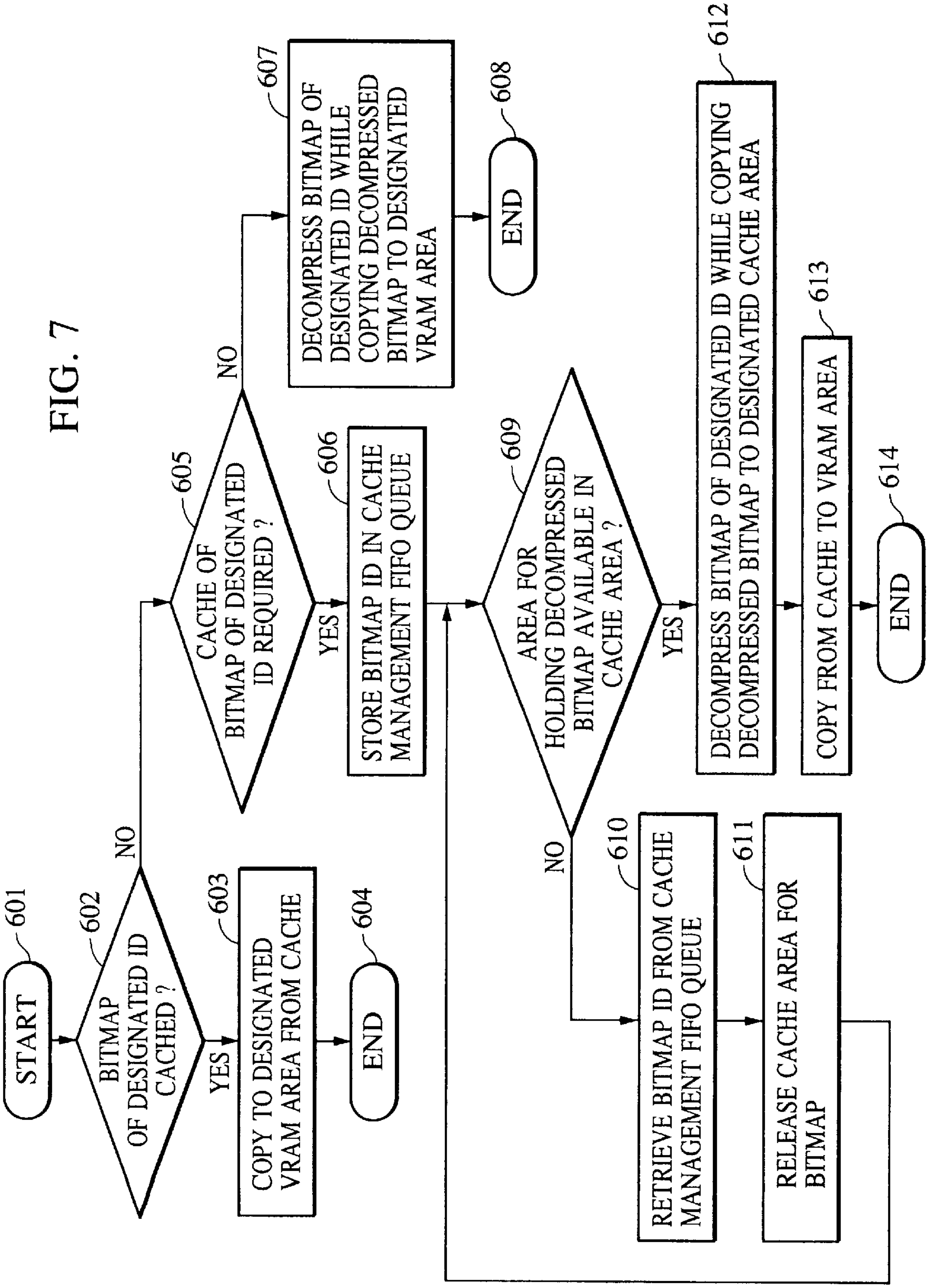
FIG. 7 is a flow diagram for screen presentation according to the first embodiment of the present invention.
Figure 8:
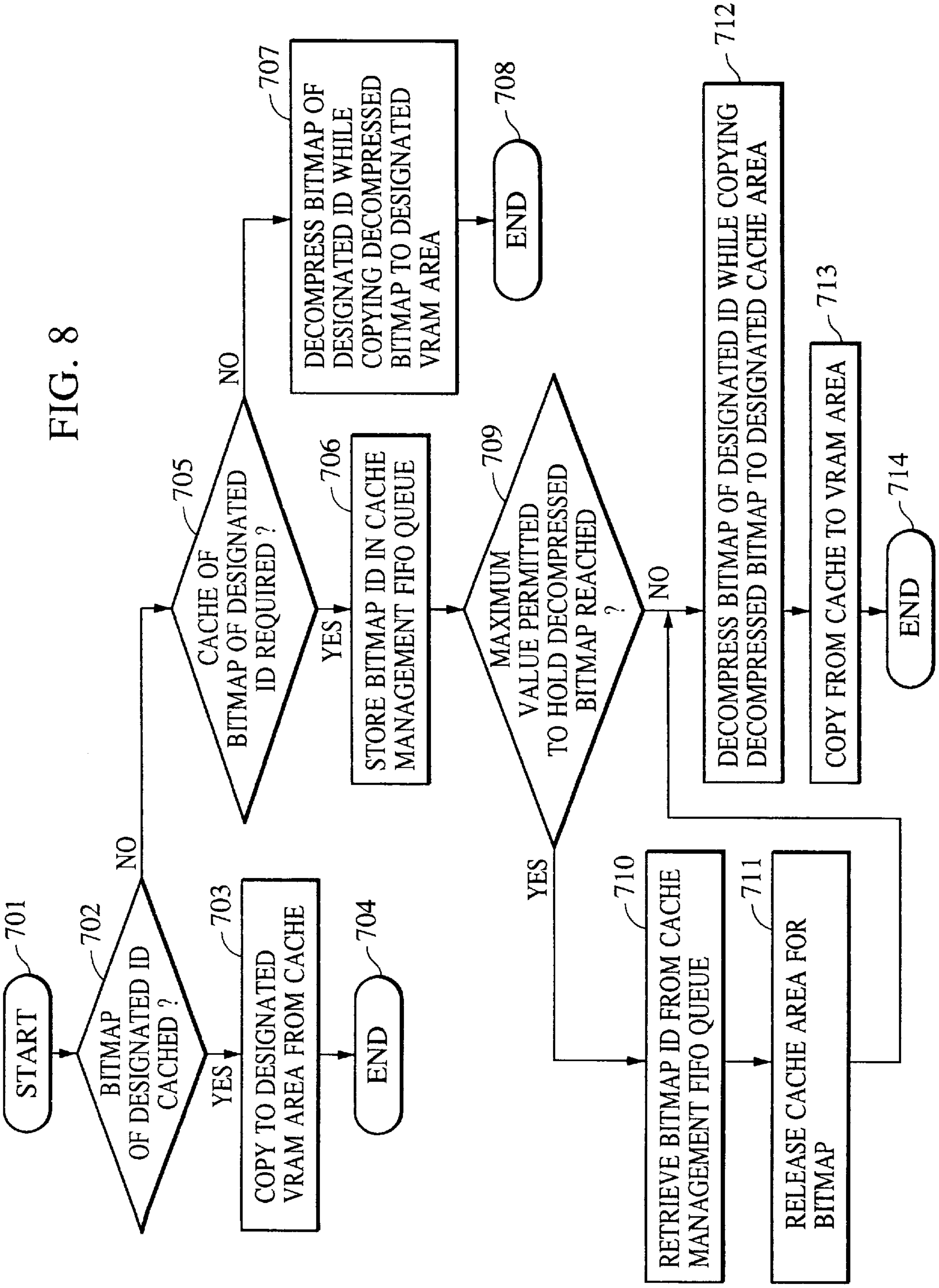
FIG. 8 is a flow diagram for screen presentation according to a second embodiment of the present invention.

Step 503 in FIG. 6 is now detailed in a flow diagram in FIG. 7. The detailed process starts in step 601. In step 602, it is determined whether the bitmap data of an ID designated is held in the cache area in RAM 302. More particularly, it is determined whether the ID is stored in a cache area management queue to be described later. When the answer is Yes in step 602, the process goes to step 603, where the bitmap data is copied from within the cache area to VRAM 313, and the process ends. When the answer is No in step 602, the process goes to step 605. It is determined whether the bitmap data of the designated ID needs to be held in the cache area. More particularly, a particular flag is attached to the ID list only when the bitmap data needs to be held and whether such a flag is present is checked. When the answer is No in step 605, the process goes to step 607. The bitmap data of the designated ID that is stored in its compressed state in the data ROM 304 is decompressed while the already decompressed data is stored in VRAM 313. The process then ends. When the answer is Yes in step 605, the process goes to step 606, where the designated bitmap data ID is stored in the cache area management queue. The queue is formed in RAM 302, and works on a FIFO (first in, first out) basis. The process goes to step 609, where it is determined whether an area for holding the decompressed bitmap data is available in the cache area in RAM 302. When the answer is No in step 609, the process goes to step 610. The bitmap data ID is retrieved from the cache area management FIFO queue, and the cache area is released for the bitmap data of the ID in step 611. Since this is a FIFO queue, the bitmap data to be released (deleted) is the one that was held first in the cache area. When the answer is Yes in 609, the process goes to step 612. The bitmap data of the designated ID that is stored in its compressed state in the data ROM 304 is decompressed while the already decompressed data is stored in the cache area in RAM 302. The process goes to step 613, where the decompressed data is then copied from within the cache to VRAM 313. The process now ends.

The bitmap data that needs to be stored in the cache is the one that is used more frequently. Stored in the cache are bitmap data for frequently used setup screens in image forming modes, for example, the standard screen, the select paper screen and magnification setting screen that are presented during the power on, reset of image forming mode, and auto clear, respectively.

The screen data stored in the cache are not limited to the above ones. For example, a service technician may cause the ID list to be presented on screen in a maintenance mode, and attach a flag to an ID to be stored in the cache.

Second Embodiment

A second embodiment employs a different process in step 503 in FIG. 6. The detailed process steps of the second embodiment are now discussed referring to a flow diagram in FIG. 8.

Steps 701 through 708 remain the same as steps 601 through 608 as illustrated in FIG. 7, and the discussion of them are not repeated. It is determined in step 709 whether the number of pieces of bitmap data held in the cache area in RAM 302 reaches the maximum value of bitmap data permitted. When the answer is Yes in step 709, the bitmap ID is retrieved from the above-described cache management FIFO queue. In step 711, the cache area is released for the bitmap data for the ID, and the process goes to step 712. Since this is a FIFO queue, the bitmap data to be released (deleted) is the one that was held first in the cache area. When the answer is No in step 709, the process goes to step 712. In step 712, the bitmap data of the designated ID that is stored in its compressed state in the data ROM 304 is decompressed while the already decompressed data is stored in the cache area in RAM 302. The process goes to step 713, where the decompressed data is then copied from within the cache to VRAM 313. The process now ends.

As described above, the area for storing the decompressed screen data is assured in RAM 302, and standard screens (during power on and reset) that are expected to be used frequently are stored in the area in RAM 302. This arrangement eliminates the time required to decompress the compressed screen data in response to the operation of the touch panel and hard keys, subsequently shortening the time required to present screens on average. A limitation is imposed on the area size for storing the decompressed screen data. When no space is available in the area for the screen data, the data stored in the area is deleted on a first in, first out basis until the size accommodating the screen data to be stored is assured in the area. With this arrangement, no large-size RAM is required for storing the screen data. In a system where constant-value data is stored in ROM, the screen data used in the system is beforehand determined statically rather than dynamically, and the frequency of screen data is predictable to some extent. When screen data has a high frequency of use in prediction, a flag may be attached to that screen data to indicate that the screen data needs to be stored in the cache. When screen data has a low frequency of use in prediction, a flag indicating that there is no need for the storing of that screen data is attached to the screen data. In this way, without increasing memory capacity, presentation speed is increased, and the operator thus enjoys a fast-speed operation of the apparatus.

The present invention is not limited to the above embodiments, and many variations and modifications are possible without departing from the scope of the present invention.

What is claimed is:

1. A display control device comprising:

a first memory for storing compressed screen data representing a variety of screens for setting image processing modes;

decompressing means for decompressing the screen data stored in said first memory;

second and third memories for storing the screen data decompressed by said decompressing means;

a display for presenting the screen data stored in said second memory;

input means for setting the image processing modes;

determining means for determining the screen to be presented on said display in accordance with an output of said input means; and control means for storing in said second memory the screen data decompressed by said decompressing means when the screen determined by said determining means is not a particular screen, and for storing in said third memory and further in said second memory the data decompressed by said decompressing means when the screen determined by said determining means is the particular screen, wherein when the screen determined by said determining means is the particular screen and when the data of the particular screen is already stored in said third memory, said control means stores the screen data stored in said third memory onto said second memory without reading the screen data from said first memory.

2. A display control device according to claim 1, wherein said determining means comprises a fourth memory for storing a list of screens that are to be presented according to the output of said input means.

3. A display control device according to claim 2, wherein said fourth memory stores identification data for identifying a screen to be presented, and wherein said control means reads the screen data from said first memory in accordance with the identification data.

4. A display control device according to claim 1, wherein said particular screen is an initial setting screen for setting an image processing mode.

5. A display control device according to claim 1, wherein said control means deletes the earliest stored screen data in said third memory to store in said third memory the data of the particular screen decompressed by said decompressing means when no further memory is available in said third memory.

6. A display control device according to claim 2, wherein said fourth memory stores a flag indicating the particular screen and wherein said control means determines, in accordance with the flag, whether the screen is the particular screen.

7. A display control method of a display control device comprising:

a first memory for storing compressed screen data representing a variety of screens for setting image processing modes;

decompressing means for decompressing the screen data stored in said first memory;

second and third memories for storing the screen data decompressed by said decompressing means;

a display for presenting the screen data stored in said second memory; and input means for setting the image processing modes;

said method comprising the steps of:

(a) determining the screen to be presented on said display in accordance with the output of said input means;

(b) storing in said second memory the screen data decompressed by said decompressing means when the determined screen is not a particular screen;

(c) storing in said third memory and further in said second memory the data decompressed by said decompressing means when the determined screen is the particular screen;

(d) storing onto said second memory the screen data stored in said third memory without reading the screen data from said first memory when the determined screen is the particular screen and when the data of the particular screen is already stored in said third memory; and (e) presenting the screen data stored in said second memory on said display.

8. A display control method according to claim 7, wherein a list of screens that are to be presented according to the output of said input means is read from a fourth memory and the screen to be presented is determined in said determining step (a).

9. A display control method according to claim 8, wherein said fourth memory stores identification data for identifying the screen to be presented, and wherein the screen data is read from said first memory in accordance with the identification data in said storing steps (b) and (c).

10. A display control method according to claim 7, wherein said particular screen is an initial setting screen for setting an image processing mode.

11. A display control method according to claim 7, wherein the earliest stored screen data in said third memory is deleted in said storing step (c) when no further memory is available in said third memory.

12. A display control method according to claim 8, wherein whether the screen is the particular screen is determined by referring to a flag stored in said fourth memory indicative of the particular screen in each of said steps (b) through (d).

13. A display control device comprising:

a first memory for storing compressed screen data representing a variety of screens for setting image processing modes;

decompressing means for decompressing the screen data stored in said first memory;

a display for presenting the screen data;

input means for setting the image processing modes;

determining means for determining the screen to be presented on said display in accordance with the output of said input means;

control means for presenting on said display the screen data decompressed by said decompressing means when the screen determined by said determining means is not a particular screen, and for storing the decompressed data in a cache memory and further presenting the decompressed data on said display when the screen determined by said determining means is the particular screen, wherein when the screen determined by said determining means is the particular screen and when the data of the particular screen is already stored in said cache memory, said control means presents the screen data stored in said cache memory on said display without reading the screen data from said first memory.

14. A display control device according to claim 13, wherein said particular screen is an initial setting screen for setting an image processing mode.

15. A display control device according to claim 13, wherein said control means deletes the earliest stored screen data in said cache memory to store in said cache memory the data of the particular screen decompressed by said decompressing means when no further memory is available in said cache memory.

16. A display control method of a display control device comprising:

a first memory for storing compressed screen data representing a variety of screens for setting image processing modes;

decompressing means for decompressing the screen data stored in said first memory;

a cache memory;

a display for presenting the screen data; and input means for setting the image processing modes;

said method comprising the steps of:

(a) determining the screen to be presented on said display in accordance with an output of said input means;

(b) presenting on said display the screen data decompressed by said decompressing means when the determined screen is not a particular screen;

(c) storing the decompressed data in said cache memory and further presenting the decompressed when the determined screen is the particular screen; and (d) presenting the screen data stored in said cache memory on said display without reading the screen data from said first memory when the determined screen is the particular screen and when the data of the particular screen is already stored in said cache memory.

17. A display control method according to claim 16, wherein said particular screen is an initial setting screen for setting an image processing mode.

18. A display control method according to claim 16, wherein the earliest stored screen data in said cache memory is deleted in said step (c) when no further memory is available in said cache memory.

* * * * *

UNITED STATES PATENT AND TRADEMARK OFFICE

CERTIFICATE OF CORRECTION

PATENT NO. : 5,977,993
DATED : November 2, 1999
INVENTOR(S) : Hiroshi Matsuda

It is certified that error appears in the above-identified patent and that said Letters Patent is hereby corrected as shown below:

<u>Column 4,</u>
Line 27, "FIG. 4A-4D and FIG. 5E-5H" should read -- FIGS. 4A-4D and FIGS. 5E-5H --.

<u>Column 8,</u>
Line 53, "decompressed" should read -- decompressed data --.

Signed and Sealed this

Fifth Day of March, 2002

*Attest:*

JAMES E. ROGAN

*Attesting Officer*

*Director of the United States Patent and Trademark Office*